May 12, 1953  C. J. WAGNER  2,638,315
TRAILER ATTACHED JACK
Filed Feb. 3, 1947
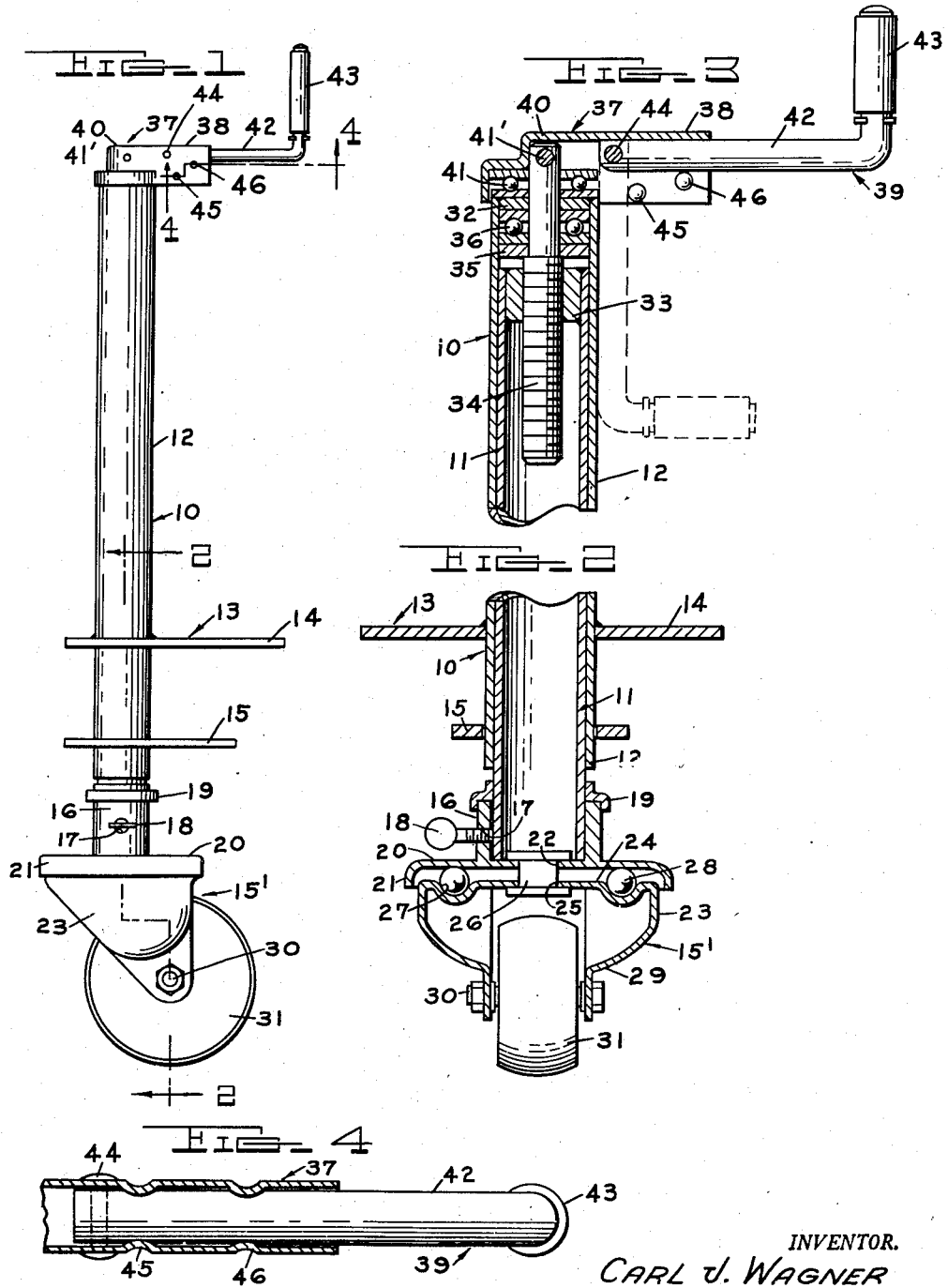
INVENTOR.
CARL J. WAGNER
BY
Whittemore Hulbert & Belknap
ATTORNEYS Patented May 12, 1953

2,638,315

UNITED STATES PATENT OFFICE 2,638,315

TRAILER ATTACHED JACK

Carl J. Wagner, Detroit, Mich.

Application February 3, 1947, Serial No. 726,022

2 Claims. (Cl. 254—86)

This invention relates generally to hoists and refers more particularly to dolly type hoists employed in connection with trailers for not only supporting the front ends of the trailers at the desired elevation from the ground, but for also raising and lowering the coupler to enable the latter to be assembled with and removed from the tractor or pulling vehicle.

One of the objects of this invention is to improve generally dolly hoists of the above type by incorporating the several parts thereof in a strong, durable assembly capable of being readily attached to trailer couplers of different designs and having readily operable means for raising and lowering the coupler or end of the trailer to which the hoist is attached.

Another feature of this invention is to provide the hoist assembly with a conveniently located handle permanently attached to the assembly and movable to a retracted out-of-the-way position where it is held until required.

A further feature of this invention is to provide a hoist with a caster and ground engaging wheel assembly readily removably secured in place.

A still further object is to provide a hoist assembly wherein the various parts thereof are protected from the weather and are sealed against the entrance of dirt, dust or other foreign matter.

The foregoing as well as other objects will be made more apparent as this description proceeds, especially when considered in connection with the accompanying drawing, wherein:

Figure 1 is a side elevational view of a dolly type hoist embodying the features of this invention;

Figure 2 is a vertical sectional view through the hoist taken substantially on the line 2—2 of Figure 1;

Figure 3 is an enlarged elevational view partly in section showing the operating handle; and Figure 4 is a sectional view taken on the line 4—4 of Figure 1.

The dolly type hoist forming the subject matter of this invention is particularly adapted for use in connection with trailers for not only supporting the front end of the trailer at the desired elevation relative to the ground, but for also raising and lowering the front end of the trailer to enable readily attaching the trailer coupling to and removing the same from the tractor or pulling vehicle.

With the above in view, reference is now made more in detail to the drawing, wherein it will be noted that the reference numeral 10 indicates a dolly type hoist assembly comprising inner and outer telescopically engaging tubes 11 and 12 respectively. The tubes are slidable relative to one another in the direction of their lengths, and the inner tube 11 projects downwardly from the lower end of the tube 12. The hoist assembly 10 is adapted to be removably clamped to a coupling unit (not shown) with the tubing extending vertically by a clamp 13. The clamp 13 comprises a top plate 14 and a bottom plate 15 spaced from each other axially of the tube. The top plate 14 is welded or otherwise fixedly secured to the outer tube 12, and the bottom plate is mounted on the outer tube 12 for sliding movement toward and away from the top plate. The arrangement is such as to permit clamping the hoist to couplings of various dimensions.

The hoist 10 is also adapted to be supported on the ground by a caster wheel assembly 15'. This assembly embodies a collar 16 adapted to be sleeved on the lower projecting end of the inner tube 11 and having a threaded opening 17 through one side for receiving a thumb screw 18. The thumb screw 18 is adapted to frictionally engage the inner tube 11 and clamp the caster wheel assembly to the tube 11. Thus the caster wheel assembly may be readily removed from the hoist by merely releasing the thumb screw 18 from frictional contact with the inner tube 11 and sliding the collar 16 off of the lower end of the tube 11.

The joint between the collar 16 and inner tube 11 is shielded from the entrance of water and foreign matter by a ring 19. The ring 19 is secured on the tube 11 above the collar 16 and is provided with an enlarged portion at the lower end for freely receiving the upper end of the collar 16. The lower end of the collar is welded or otherwise secured to a disc 20 having a depending marginal flange 21 and having a central opening 22 therethrough.

A bracket 23 is positioned below the disc, and is provided with a top wall 24 having a central opening 25 therethrough registering with the opening 22. A double-headed pin 26 extends through the aligned openings and serves to pivotally connect the bracket 23 to the disc 20. In the present instance, the top wall 24 is formed to provide an annular groove 27 concentric with the axis of pivotal movement of the bracket and adapted to retain a series of balls 28. The balls 28 also engage the bottom surface of the disc 20 and serve as an antifriction bearing for the bracket 23.

The bracket 23 is also provided with laterally spaced forwardly extending arms 29 having aligned openings through the free end portions thereof for receiving the wheel axle 30. The axle 30 forms a support for the caster wheel 31, which is of sufficient width to minimize the tendency for the same to sink into the ground, when the weight for the forward end of the trailer is supported thereby.

The upper end of the outer tube 12 extends beyond the corresponding end of the inner tube 11 and is closed by a disc 32. A nut 33 is welded or otherwise fixed into the upper end of the inner tube 11, and a screw 34 is threaded into the nut. The upper end of the screw projects through a central opening formed in the disc 32 and a washer 35 is secured to the screw above the nut 33. The washer 35 is spaced below the disc 32 and a thrust bearing 36 is supported therebetween.

It follows from the foregoing that rotation of the screw 34 in one direction effects a relative sliding movement of the tubes to increase the effective length of the hoist and rotation of the screw in the opposite direction imparts a relative sliding movement to the tubes to reduce the effective length of the hoist. In the present instance the screw is rotated by a handle assembly 37 comprising a bracket 38 and a crank handle 39. The bracket 38 is formed with an elongated downwardly opening channel-shaped portion having a cap 40 at one end adapted to fit over the upper end of the tube 12 to provide a weather shield for the tube. The cap portion 40, however, rotates relative to the tube 12 and is supported on a thrust bearing 41 supported in the tube 12 above the disc 32. The upper end of the screw 34 extends into the channel and is secured to opposite walls of the channel by a pin 41'.

The crank handle comprises a shank 42 and rotatable grip 43 extending laterally outwardly from one end of the shank. The other end portion of the shank 42 extends into the channel-shaped bracket 38, and is pivoted to opposite side walls of the bracket by a pin 44. The construction is such as to permit swinging movement of the handle from the operative or full line position thereof shown in Figure 3 to the inoperative or dotted line position shown in the same figure of the drawing. When the crank handle is in its full line position, the shank 42 extends parallel to the bracket 38 between the flanges on the latter and cooperates with the bracket to enable rotation of the screw 34. On the other hand, when the crank handle is in its inoperative position, the shank 42 extends along one side of the hoist where it is out of the way.

In accordance with this invention, the crank handle is releasably latched in both its operative and inoperative positions. As shown in Figure 4 of the drawings, one flange of the channel-shaped bracket is fashioned to form two indentations or detents 45 and 46. The relative positions of the detents is such that when the handle is moved to its operative position, the detent 46 engages the bottom portion of the shank 39 to frictionally hold the shank against downward swinging movement. However, the dimension of the detent 46 is such as to permit forcibly swinging the handle past the same to the inoperative position thereof. The detent 45 is positioned to cooperate with the upper portion of the shank to hold the latter in its inoperative position against or adjacent to the outer tube 12 of the hoist. Thus while provision is made to retain the operating handle in an out-of-the-way position when not in use, nevertheless, the construction is such as to permit the handle to be readily located in its operating position when it is desired to manipulate the hoist.

What I claim as my invention is:

1. In a hoist to be mounted upon a trailer frame comprising telescopically engaged inner and outer tubes, the outer tube forming a hollow post extending upward above its attachment to the trailer frame, a ground engaging member at the lower end of the inner tube and a screw rotatably secured to the upper end of said post and threadedly engaging the inner tube to raise and lower the same; means for rotating said screw including a member directly secured to the screw having a portion forming a cap for the post with an inverted channel-shaped bracket portion extending radially outward beyond the same and a crank handle having a shank portion extending into said channel and pivotally secured thereto.

2. The construction as in claim 1 in which said channel portion has detents pressed inward from one side thereof for latching said handle in either of the aforesaid positions thereof.

CARL J. WAGNER.

References Cited in the file of this patent

UNITED STATES PATENTS

| Number | Name | Date |
|---|---|---|
| 1,076,555 | Dillon | Oct. 21, 1913 |
| 1,191,855 | Tuszka | July 18, 1916 |
| 1,453,989 | Norlund | May 1, 1923 |
| 1,597,347 | Fildes | Aug. 24, 1926 |
| 1,802,840 | Schneider | Apr. 28, 1931 |
| 2,348,869 | Wagner | May 16, 1944 |
| 2,523,152 | Seyferth | Sept. 19, 1950 |